Nov. 18, 1952     S. KHALIL     2,618,308
TIRE
Filed Oct. 29, 1947
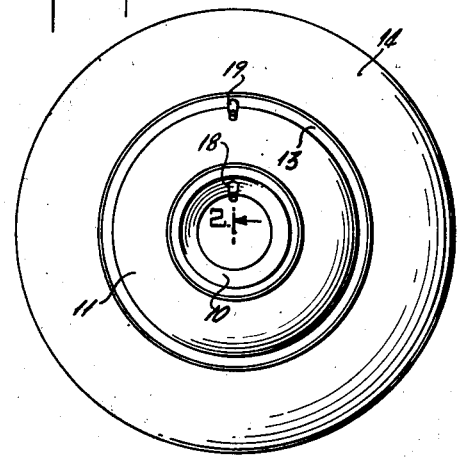
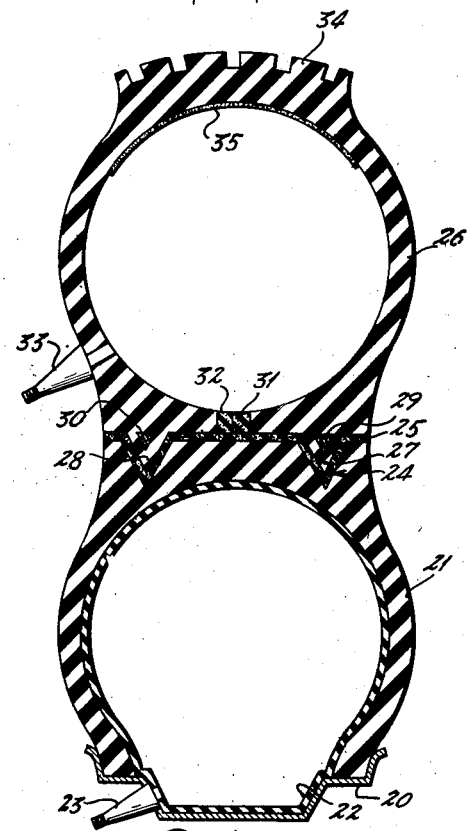
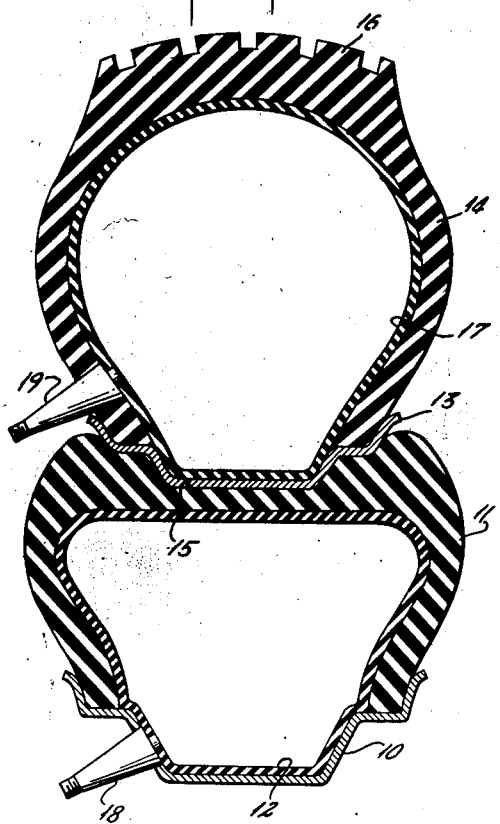
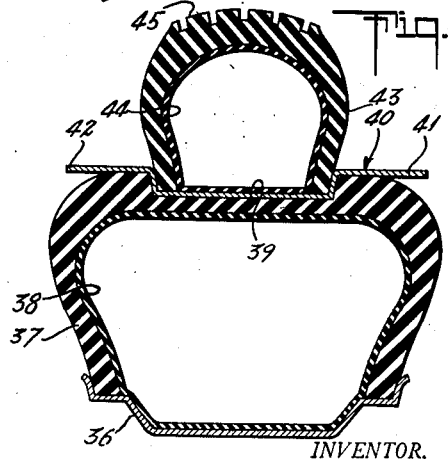
INVENTOR.
SEYED KHALIL
BY Van Demeter + Grier
ATTORNEYS Patented Nov. 18, 1952

2,618,308

UNITED STATES PATENT OFFICE 2,618,308

TIRE

Seyed Khalil, New York, N. Y.

Application October 29, 1947, Serial No. 782,843

9 Claims. (Cl. 152—339)

This invention relates to improvements in pneumatic tires and is directed more particularly to a tire having a compound casing.

This application is a continuation-in-part of my copending applications Serial Nos. 740,530, filed April 10, 1947, now Patent No. 2,524,808, dated October 10, 1950; 762,271, filed July 21, 1947, now Patent No. 2,574,266, dated November 6, 1951; and 774,516, filed September 17, 1947, now Patent No. 2,525,752, dated October 10, 1950. In said applications, a single casing is divided into chambers by means removably inserted therein, and in the last mentioned application, the casing is provided with annular webs extending toward each other from the casing in the sides thereof, and a shield interlocking with said webs thereby functions as (1) a shield to divide the interior of the casing into two chambers, and (2) as a bracing means for minimizing and/or nullifying the flexure of the side walls of the tire outwardly.

Among the differences between my tire and those of the prior art are that my compound casing is comprised of two casings which, when inflated, are interlocked so that one is supported on the other. One form of the invention contemplates the provision of metallic means between the casings and another form contemplates the provision of non-metallic means between the casings. Since the interior compartments of the two casings are completely isolated from each other, the flexure, where the casings are supported on each other, is nil, and therefore in the individual chambers or compartments, and in accordance with the pressure at which the individual sections are inflated, I obtain differential flexure, which is superior to the ordinary flexure of tires of the prior art.

My compound casing is comprised of not less than two annular casings, the inner one of which is treadless and provided with an annular depression to accommodate and support the next succeeding outer casing or, where only two casings are employed, the outer casing. The outer casing is provided with a tread. The air pressure, when the two casings are inflated, holds the two together in locked relation.

The casing which is mounted on the wheel or rim may be termed the "primary" casing, and the casing which is mounted on the primary casing and which carries a tread, may be termed the "secondary" casing. In the modification, where non-metallic means is provided between the casings, the secondary casing, which is the outer one, is sealed off by the non-metallic means and may be inflated directly, instead of using an inner tube. If this is done, the interior of the casing, at least as wide as the width of the tread, may have a coating of material thereon adapted to enter into and cure punctures.

My new and improved compound tire has qualities which were heretofore unknown in this art and the most important of these qualities is the feature of obtaining differential flexure. My differential flexure provides (1) a highly efficient and comfortable cushion; (2) it provides much greater safety, particularly where the vehicle is driven on a curved path; (3) it provides more equable alignment of the wheels of a vehicle, particularly when it is being driven at a high rate of speed; and (4) balancing of the wheels of the vehicle.

To clearly explain the meaning of and the application of differential flexure, it is herewith pointed out that with my new and improved tire, two types of flexure are obtained: (1) flexure which might be termed "ordinary flexure" and (2) flexure which might be termed "extraordinary flexure."

The ordinary flexure may be said to be similar to the ordinary flexure obtained in many casings of the prior art, except, however, for the fact that my tire, which is composed of two casings, has two ordinary flexures (one for each of the component parts) as compared with a single casing which has only one ordinary flexure.

Extraordinary flexure occurs at an angle with respect to ordinary flexure.

Now, in order that the meaning, the cause, and the advantages of extraordinary flexure, such as I obtain in my compound tire, may be clearly understood, an explanation of the causes of skidding of vehicles carrying ordinary tires is in order.

When a vehicle carrying ordinary tires is driven on a curved path, the hub of the outer rear wheel, due to centrifugal force, tends to move outwardly and consequently causes skidding. Since the ordinary casing on that wheel is directly in contact with the ground, the pulling of the same laterally by the hub will, under certain conditions (as is well known to those skilled in the art) pull therewith the tread of said casing, and the pulling of said tread causes the vehicle to move therewith. In other words, the casing moves in the direction in which the hub tends to move, as if both the casing and the hub were a single unit. Such pulling of the casing and the consequent pulling of the wheel upon which it is mounted causes skidding of the vehicle.

Contrasted with the above skidding effects of casings of the prior art, the extraordinary flexure of my compound casing produces a compensating action which tends to minimize skidding effects. The hub pulls my primary casing, but since the tread of the secondary casing is in frictional contact with the ground or road, it resists the pulling of the primary casing, consequently, the pulling part of the primary casing drags therewith the part of the secondary casing with which it is in contact, and flexure is produced on the sides of the secondary casing and this flexure is termed "extraordinary flexure."

Before the extraordinary flexure can reach a maximum, the tread on the secondary casing, due to the rotation of the vehicle wheel, will change its position of contact with the ground, and a new series of extraordinary flexures is produced which tends to nullify skidding tendencies.

A highly important advantage of my compound casings with differential flexure, is the highly smooth cushion that my tire provides between the vehicle and the surface over which it is driven.

Suppose the primary casing is "hardly" inflated while the secondary casing is "softly" inflated. The flexure will start in the secondary casing and will end in both the secondary and the primary casings. This provides a highly desirable cushioning effect. Then add to this the cushion produced by extraordinary flexure, and we have what might be termed a "differential cushion."

If vehicles were driven always along a straight path at the same speed and under the same temperature and humidity conditions, on a smooth pavement, with the same load, existing tires on their wheels would give ideal conditions. However, it is a well known fact that no vehicle is driven any appreciable length of time under such ideal conditions. Each revolution of the wheel of a vehicle rotates under constantly changing conditions and some of these conditions provide a more or less uncomfortable ride and others cause accidents.

My new and improved compound tires, with differential flexures, counteract and compensate these conditions and thereby provide a most comfortable ride and minimize the causes of accidents, at least insofar as the above mentioned conditions are concerned.

In order to show the versatility of my new and improved compound tire with one casing supported on and interlocked with another casing which is carried on the rim of the vehicle wheel, I have illustrated herein a compound casing in which a metallic member is interposed between the two interlocked casings, a modification thereof where the metallic member is extended and is adapted for plural use, and yet another modification in which non-metallic means is provided between the casings.

Referring to the drawings:

Figure 1 is a side elevation of a motor vehicle wheel showing my new and improved compound casing mounted thereon;

Figure 2 is a sectional elevation, taken along the lines 2—2 of Figure 1;

Figure 3 is a sectional elevation of a modified form of the arrangement shown in Figure 2, wherein non-metallic means is positioned between the two casings forming the compound tire; and Figure 4 is a sectional elevation of a further modification of the invention, wherein metallic means is provided between the two casings forming the compound tire, said metallic means having lateral extensions which permit the tire to be run on a trackway or the like.

Referring to Figure 1, a rim 10 has mounted thereon a casing 11 which contains a pneumatic tube 12. Mounted on the casing 11 is a rim-like member 13 and mounted on the rim-like member 13 is a casing 14.

As shown in Figure 2, the casing 11 is preferably not provided with a tread, but instead it has an annular depression 15 formed therein to conform to the inner surface of the rim-like member 13. The casing 14 has a tread 16 formed thereon and within the casing 14 may be placed a pneumatic tube 17. A valve stem 18, extending through a suitable hole formed in the rim 10, is provided for inflating the pneumatic tube 12. A valve stem 19 may extend through the wall of the casing 14, just clearing the rim-like member 13, for inflating the pneumatic tube 17.

When placing the casing 11 with its tube 12 on the rim 10, a slight amount of air is put into the tube 12, as is ordinarily customary. This leaves the casing 11 sufficiently soft, flexible and deformable, to enable one to mount the rim-like member 13 thereon in the depression 15. Following this, the casing 14, with its pneumatic tube 17, is mounted on the rim-like member 13 in the usual and customary way that an ordinary casing and tube is mounted on a rim. The tubes 12 and 17 may be individually inflated via the valve stems 18 and 19, respectively, to any desired pressure, and these pressures may be in accordance with the conditions under which the compound tire is to be used. For example, if the tube 17 is inflated to a higher pressure than the pressure in the tube 12, the casing 11 will be substantially more flexible and will give "easy" riding qualities.

My new and improved arrangement is simple, foolproof, and it does not involve any special tools for applying it to the rim of a vehicle, as tools ordinarily employed for applying tires to rims are all that is necessary.

Due to the fact that the tube in each casing is individually inflatable, a wide variety of pressure combinations may be obtained, due to the fact that there is a solid casing wall and a metallic member, such as 13, spanning the tire. Intermediate the tread and the vehicle rim, lateral bulge of the tire is localized into two areas, one adjacent to the vehicle rim and one between the rim-like member 13 and the tread 16. Obviously, the metallic member 13 can be omitted entirely or non-metallic means may be substituted therefor. This is the case in the modification shown in Figure 3, where a vehicle rim 20 has a casing 21 mounted thereon. Within the casing 21 is a pneumatic tube 22 into which air may be fed via a valve stem 23 passing through a suitable hole formed in the rim 20.

The exterior surface of the casing 21 has an annular conformation 24 formed therein. This conformation is shown as somewhat different from the conformation 15 in the tire 11, but I do not wish to be limited to having the conformation follow a limited pattern, because obviously this conformation can be of many shapes, all of which are equally effective.

Positioned in the conformation 24 is a web of non-metallic material 25. In the sample shown, this is soft rubber, although it can be any suitable non-metallic material. A casing 26 has depending portions 27 and 28 which conform to corresponding grooves forming a part of the conformation 24. Within the body of the casing 26 and adjacent to the depending portion 27 is an annular reinforcement 29. Likewise, on the other side, adacent the portion 28, is a similar reinforcement 30.

The lips of the casing 26 are provided with cooperating annulae 31 and 32 of soft rubber, which are of such thicknesses that when the casing 26 is mounted on the casing 21, these annulae engage each other under stress and form a fluid-tight closure. A valve stem 33 may extend through the wall of the casing 26 and communicate with the interior thereof, so that said interior may be inflated. The casing 26 is provided with a tread 34 and within the interior of the casing is a layer of material 35 suitable for closing and healing.

Referring now to Figure 4, a vehicle rim 36 has mounted thereon a casing 37 which may contain a pneumatic tube 38. Although no valve stem is shown for inflating this tube, it is obvious that such a valve stem may be arranged like the valve stem 18 or the valve stem 23. The casing 37 has an annular cavity 39 formed therein to accommodate a metallic rim-like member 40. The rim-like member 40 has a depressed portion which fits the annular cavity 39 and it has an annular portion 41 which is laterally flat, extending from the right side thereof, as seen in Figure 4, and a second annular portion 42 which extends therefrom to the left, as seen in Figure 4.

Mounted in the depressed portion of the rim-like member 40 is a second casing 43 which may be provided with a pneumatic tube 44 and which carries a tread 45. No valve stem is shown in Figure 4 for inflating the pneumatic tube 44, but it is obvious that a valve stem, such as that shown at 19, in Figure 2, may be arranged in the same manner for inflating the tube 44.

It will be noted that the casing 37 has portions adjacent to the annular cavity for backing up the annular extensions 41 and 42.

The casing 37 is substantially larger and consequently has a much greater volume content than the casing 43. Therefore, it may be inflated softly for maximum cushion effect, while the casing 43 may be inflated harder. Now, in the event that the arrangement shown in Figure 4 is used on rails, so that either the surface 41, the surface 42, or both, run on rails, there is an ample air cushion between such rails and the vehicle upon which the rim is mounted. On the other hand, if the casing 43 runs on the surface of the ground or roadway, the cushion effect of the tire 37 is superior to any like device of the prior art.

In all three of the forms of the invention described above, it will be understood that the air pressure in the casings forces the pair into interlocking relation.

Also, in all three forms of the invention shown, the element interposed between and contacted by both casings may be omitted and the outer casing may be mounted directly on the inner casing.

In the form shown in Figure 3, the non-metallic member 24 between the two cooperative casings may be formed of a material which is softer than the rubber of which the casings are comprised and when both casings are inflated, the air pressure acting in all directions, forces the casings into intimate contact with each other, and due to the fact that the non-metallic material is soft, it conforms to the surfaces of the casings which are made of a material which is not as soft as the insert, and thereby eliminates the necessity of exercising extreme accuracy in constructing the casings.

In the form shown in Figure 2, the metallic member 13 between the two cooperative casings is the counterpart of the shield employed in my earlier applications herein referred to, and it may conveniently be made in the form of a rim or in any other desirable shape, keeping in mind the interlocking feature.

In the form shown in Figure 4, the shield member 40 may perform a double function: (1) it has a depressed portion which functions with the two casings to interlock them when they are both inflated; and (2) it functions as a metallic tire or wheel surface which is particularly adapted to operate on rails, and a good example of such a use of such a tire is to equip aircraft, such as are carried on vessels, carriers, etc., with such tires, and the extended portions 41 and 42 of the member 40 cooperate with the rails on the catapult for launching the planes from the ship. Now, when the aircraft returns to the ship, the outer casing is particularly adapted to roll on the deck during the landing operation.

It can be seen that I have provided two component parts which can be readily interlocked with each other to form my compound casing. In the preferred form of my invention, I insert the tube 17 in the casing 14 and after putting a small amount of air therein, I insert the metallic ring 13. Next, I deform the casing member 11 sufficiently to insert it into casing member 14. In inserting the casing member 11 into said casing 14, the depression 15 which is provided on the periphery of the casing 11 acts as a guide to readily position said two casing members together in the proper relation to each other. In other words, the guide enables one to readily mount the two casing members together.

It can be seen that a similar assembling guide is provided with the other two examples shown in Figures 3 and 4, the shape of the guides in Figures 3 and 4 varying from the guide 15, shown in Figure 2.

The depressions or guides of the different forms shown in Figures 2, 3 and 4 each have two purposes: (a) as a guide for assembling, as stated above; and (b) as a locking means to prevent lateral displacement of the two cooperative casing members.

What is claimed is:

1. In a compound tire, a pneumatic casing having depressed annular socket means formed on the periphery thereof instead of a tread, an annular web mounted on said casing and conforming to said annular socket means, and a second pneumatic casing mounted on said web and having a tread on its outer periphery, said second casing having protrusions conforming to said annular web when the latter is mounted in and conforms to said annular socket means, said casings, when inflated, being adapted to interlock with said web to form said compound tire.

2. In a compound tire, a casing adapted to be mounted on the rim of a wheel, the periphery of said casing comprising an annular flat portion formed integral with and having spaced annular depressions formed therein, web means mounted on said surface and conforming to it and to said depressions, and a second casing mounted on the periphery of said first casing with said web means therebetween, said second casing including a portion conforming to said depressions and having an outer periphery carrying a tread.

3. In a compound tire, a casing adapted to be mounted on the rim of a wheel, the periphery of said casing including an annular flat portion formed integral therewith and having annular depressions formed therein, a web of material carried on said surface and conforming to it and to said depressions, a second casing mounted on said first casing with said web of material sandwiched therebetween, said second casing including a portion conforming to said depressions and having annular rings of resilient material on the lips bordering the opening therein, said lips being in cooperative relationship to render said second casing fluid-tight, and a tread on the outer periphery of the said second casing.

4. A tire according to claim 3 in which said second casing has annular reinforcing means embedded therein adjacent to said portions conforming to said depressions.

5. In a pneumatic tire, a wheel, a primary casing mounted on said wheel, spaced annular depressed socket means formed on the periphery of said casing, annular web means in said socket means, a secondary casing mounted on said primary casing, said secondary casing being adapted to be folded and adapted to cooperate with said web means and become air-tight after it has been assembled with said primary casing.

6. In combination, a vehicle carrying a plurality of compound pneumatic tires, each of which is comprised of a compound casing constituting a beadless casing member having a tread adapted to form sole contact with the ground, and a second casing member having beads adapted to embrace the rim upon which it is mounted concentrically, said second member being assembled concentrically within and supporting said first member and both said members including laterally spaced annular depressions and cooperative annular protrusions being interlocked at their intersections by the force of the air pressure within them, said casings and the wheels upon which they are mounted being adapted to rotate as said vehicle moves along, means associated with said vehicle to enable said wheels and said casings to maintain a given rotary phase with each other, said intersections, due to the adjacent flexible portions, being adapted to enable the portions of said casings which are in contact with the ground to yield to said phase when other parts of said casing, due to abnormal rotations of said wheels, may deviate from said phase.

7. In a compound tire, a pneumatic casing arranged to be mounted on the rim of a vehicle wheel, depressed socket means formed on the periphery of said casing and having laterally spaced V-shaped annular locking depressions therein, and a second pneumatic casing carrying a tread on its outer periphery and mounted on said annular socket means with annular V-shaped protrusions engaging said depressions and supported by said socket means on said first casing.

8. In a compound tire, a casing adapted to be mounted on a rim and having an annular periphery parallel to the axis thereof instead of a tread, spaced annular depressions formed in said periphery, an annular rim-like member mounted on said casing conforming to said periphery and having lateral extensions, and a second casing mounted on said annular rim-like member and carrying a tread, the lateral width of said second casing being less than the lateral width of said first casing, said casings, when inflated, being adapted to interlock with said rim-like member to form said compound tire.

9. In a pneumatic tire, a rim constituting a primary mounting well, a primary casing mounted on said well, annular socket means formed on the outer periphery of said primary casing and lying on an annular plane displaced radially from said well and including spaced apart annular depressions therein, a secondary casing mounted on said primary casing, and guide means between said primary and secondary casings engaging said periphery and said depressions.

SEYED KHALIL.

REFERENCES CITED

The following references are of record in the file of this patent:

UNITED STATES PATENTS

| Number | Name | Date |
| --- | --- | --- |
| 508,621 | Kirk et al. | Nov. 14, 1893 |
| 1,033,944 | Rushton | July 30, 1912 |
| 1,064,611 | Chipley | June 10, 1913 |
| 1,131,772 | Chinnock | Mar. 16, 1915 |
| 1,989,402 | Cupp | Jan. 29, 1935 |
| 2,231,745 | Altmyer | Feb. 11, 1941 |

FOREIGN PATENTS

| Number | Country | Date |
| --- | --- | --- |
| 27,882 | Great Britain | 1906 |